United States Patent
Matzinger et al.

(10) Patent No.: US 6,541,538 B1
(45) Date of Patent: Apr. 1, 2003

(54) RESIN FOR INK-JET PRINTING INK

(75) Inventors: Michael D. Matzinger, Mt. Pleasant, SC (US); G. Frederick Hutter, Charleston, SC (US)

(73) Assignee: Westvaco Corporation, New York, NY (US)

( * ) Notice: Subject to any disclaimer, the term of this patent is extended or adjusted under 35 U.S.C. 154(b) by 439 days.

(21) Appl. No.: 09/167,878

(22) Filed: Oct. 7, 1998

Related U.S. Application Data

(63) Continuation-in-part of application No. 09/140,997, filed on Aug. 26, 1998, now abandoned.

(51) Int. Cl.$^7$ ............ C09D 11/10; C08F 226/10; C08F 226/02; C08F 220/58; C08L 39/00; C08L 39/06
(52) U.S. Cl. ............ 523/160; 524/555; 526/264; 526/304
(58) Field of Search ............ 523/160, 161; 106/31.27, 31.6; 524/551, 555; 526/263, 264, 287, 288, 292.2, 304, 311, 312

(56) References Cited

U.S. PATENT DOCUMENTS

| | | | | |
|---|---|---|---|---|
| 3,910,862 A | * | 10/1975 | Barabas et al. | 525/326.9 |
| 3,948,866 A | * | 4/1976 | Pennewiss et al. | 528/373 |
| 4,235,982 A | * | 11/1980 | Maslanka et al. | 525/284 |
| 4,871,594 A | * | 10/1989 | Bister et al. | 427/430.1 |
| 5,026,427 A | * | 6/1991 | Mitchell et al. | 106/31.6 |
| 5,126,392 A | * | 6/1992 | Nakashima et al. | 524/458 |
| 5,431,723 A | * | 7/1995 | Bermes et al. | 106/31.43 |
| 5,439,514 A | * | 8/1995 | Kasiwazaki et al. | 106/31.65 |
| 5,656,071 A | * | 8/1997 | Kappele et al. | 106/31.76 |
| 5,690,723 A | * | 11/1997 | Sano et al. | 106/31.75 |
| 5,851,274 A | * | 12/1998 | Lin | 106/31.43 |
| 5,852,075 A | * | 12/1998 | Held | 523/161 |
| 5,861,447 A | * | 1/1999 | Nagasawa et al. | 523/161 |

* cited by examiner

Primary Examiner—Callie E. Shosho
(74) Attorney, Agent, or Firm—Terry B. McDaniel; Daniel B. Reece, IV; Thomas A. Boshinski

(57) ABSTRACT

A cationic, water-soluble polymer is disclosed as an ink-jet ink resin to improve color-fastness and adhesion of an ink-jet printing ink. Also disclosed is a method for preparing the invention resin and the ink-jet ink formulation comprising same.

30 Claims, No Drawings

RESIN FOR INK-JET PRINTING INK

CROSS-REFERENCE TO RELATED APPLICATION

This application is a continuation-in-part of application Ser. No. 09/140,997 entitled "Coating Resin for Ink-Jet Printing Ink Substrates," filed Aug. 26, 1998 now abandoned.

BACKGROUND OF THE INVENTION

1. Field of the Invention

The present invention relates to ink-jet inks. More particularly, the present invention relates to resins employed in ink-jet inks. The present invention further relates to a method for preparing such resins and an ink formulation comprising the resins.

2. Description of the Prior Art

Ink jet printing is a non-impact means of generating images by directing small droplets or particles in rapid succession onto the surface of a substrate. There are various possible ways of generating and projecting droplets, but only two main systems appear suited to real production applications.

The first uses a continuous stream of droplets which are electrostatically charged as they leave the nozzle and are deflected in flight by the application of a high voltage to a set of deflector plates. The charge on each individual droplet can be varied so that as the stream passes through the deflector plates, which are maintained at a constant electromagnetic potential, the trajectory of each drop (and hence its point of contact on the substrate) can be accurately controlled.

The other technique is known as "drop-on-demand" or "impulse" printing. The drops are not normally charged or deflected in their travel to the substrate. Thus, a matrix consisting of a bank of nozzles is required to create the image.

The inks used must have physical properties suitable for jet formation and streaming while being capable of producing sharp, dense, and permanent images. In addition, they should by stable on storage and must present no long-term health, or short-term chemical, hazard.

For accurate and consistent drop formation, the inks must possess a careful balance of rheology, surface tension, and (for continuous jet machines) conductivity. Flow should ideally be Newtonian, but viscosity may vary from machine to machine. Impulse jets place more critical requirements on ink viscosity than continuous jets because of their mode of operation which demands that they maintain a stable viscosity during long periods of use. Unfortunately, viscosity varies with temperature; and, for this reason, a number of impulse jet machines incorporate thermostatically controlled nozzles.

Surface tension is also a critical factor in the formation and maintenance of discrete drops. Water, at 72 dynes/cm, would provide the optimum surface tension; but, because it is blended with dyes, resins, and additives, this figure is not achieved. A more approachable figure is 50–60 dynes/cm. Solvent-based inks for continuous drop printers have even lower surface tensions.

In many applications, prints must dry quickly. This does not present too much of a problem with continuous jet printers, as fast drying solvents such as ethanol or methyl ethyl ketone (MEK) can be used. An ink based on such fast drying solvents would dry in the nozzles of an impulse jet printer, and it is therefore difficult to formulate a true "fast-drying" ink. Most impulse jet inks are based on slow evaporating glycols to minimize evaporation.

Glycol and water-based jet inks dry by absorption into a porous substrate. On more absorbent substrates, drying will be quicker, but, for example, there will be a greater tendency for the ink to spread through the fibers in a paper substrate giving poor ink definition and strike through. By formulating to the limits of the viscosity and surface tension specifications, it is possible to minimize this problem. Also, it can be avoided, or minimized, by using a less absorbent substrate.

In the case of non-absorbent surfaces, binder choice is critical. Almost all solvent-based jet printing inks contain resinous binders to give key and hardness. Binder resins are selected for their general adhesion and solution properties and include acrylics, polyamides, and maleics.

Most ink systems contain soluble dyes which give satisfactory color properties for most work. Color strength is limited by the solubility of the dye, but with careful selection ranges of bright strong colors can be produced. Pigments are rarely used, because they present flow, clogging, nozzle wear, and stability problems.

Dye solubility in water tends to be dependent on pH and ink-jet systems are normally adjusted to be neutral or slightly alkaline. To prevent pH variation due to absorption of carbon dioxide from the atmosphere, such systems may also be buffered with additives such as sodium carbonate. Also, pH can have an effect on the corrosiveness of the ink system in contact with certain metals, and this must be borne in mind when formulating for specific machines.

*The Printing Ink Manual* (Fourth Edition, 1988) gives the following as typical ink-jet ink formulations:

TABLE I

Typical Ink Formulations

A. Solvent-based Continuous Jet Ink

| | | |
|---|---|---|
| Aniline Blue | 3.0 | Solvent-soluble dye |
| Phenol-formaldehyde polymer | 6.0 | Film-forming polymer to give resistance and adhesion to substrate |
| Alcohol | 49.5 | Solvent |
| Dimethyl formamide | 41.0 | Solvent |
| Soluble electrolytes | 0.5 | Conductivity aid |
| | 100.0 | |

Final characteristics:

Viscosity, 2.1 cp. at 20° C.
Conductivity, 1200 micromhos/cm
Surface tension, 25 dynes/cm at 20° C.

B. Water-based Continuous Jet Ink

| | | |
|---|---|---|
| Direct Black Dye | 4.25 | |
| Distilled Water | 83.15 | |
| Polyethylene Glycol | 5.00 | Crusting Inhibitor |
| N-Methylpyrollidone | 4.00 | Dye Solvent |
| Ethylene Glycol Monobutyl Ether | 3.00 | Paper Penetrant |
| Sequestering Agent | 0.20 | Heavy Metal Suppressor |
| Buffering Agent | 0.30 | pH Control |
| Biocide | 0.10 | Anti-mold |
| | 100.00 | |

Final characteristics:

Viscosity, 2.28 cp. at 20° C.
Conductivity, 11,000 micromhos/cm
Surface tension, 43.5 dynes/cm
pH, 10.3

TABLE I-continued

Typical Ink Formulations

C. Impulse (Drop-on-Demand) Jet Ink

| | | |
|---|---|---|
| Direct Dyestuff | 3.0 | Soluble Dyestuff |
| Polyethylene Glycol | 14.0 | Anti-clogging Solvent |
| Diethylene Glycol | 12.0 | Humectant |
| N-Methylpyrollidone | 15.0 | Dye Solubiliser |
| Biocide | 0.1 | Anti-fungal |
| Buffering Agents | 0.3 | pH Control |
| Polyvinyl Alcohol | 3.0 | Viscosity Controller |
| Triethanolamine | 1.0 | Surface Tension Controller |
| Distilled Water | 51.6 | Solvent |
| | 100.0 | |

Final characteristics:

Viscosity, 9.0 cp. at 20° C.
Surface tension, 45 dynes/cm
pH, 10.5

Typical of the dyes used in ink-jet ink formulations are disclosed in the following U.S. patents:
U.S. Pat. No. 4,761,180 Dyes Containing Tetramethylammonium Cation for Ink-jet Printing Inks
U.S. Pat. No. 4,836,851 Dyes Containing Polyhydroxyl Groups for Ink-jet Printing Inks
U.S. Pat. No. 4,994,110 Dyes Containing Lithium for Ink-jet Printing Inks
U.S. Pat. No. 5,098,474 Dyes Containing Alkylamino Groups for Ink-jet Printing Inks Although dyes, rather than pigments, have been the traditional ink colorant of choice for ink jet printers for fluidity and anti-clogging requirements, dyes do present several disadvantages. They may smear when brushed by an oily finger. They are water-soluble and remain so after drying. So, they redissolve upon contact with water and will run when exposed to a water spill. Also, dye images smear on contact with felt tip pen markers. Therefore, dyes may make the ink-jet ink exhibit poor color-fastness. In addition, they exhibit poor light stability relative to pigments and are known to fade even under conditions of office fluorescent lighting. Thus, there are several disadvantages with the use of dye-based ink-jet inks, many of which prohibit their use in applications requiring fast drying times and improved light-fastness, or greater light stability.

To improve the color-fastness of ink-jet prints, manufacturers are developing pigment-based inks. Examples include U.S. Pat. Nos. 5,172,133 and 5,529,616. Due to the low ink viscosity needed for this mode of printing, however, ink jet inks contain low levels of resin. This makes binding of the pigment onto the paper difficult. Weak bonding of pigment to paper results in poor color-fastness.

Therefore, an object of the instant invention is to provide an ink-jet printing ink resin that enhances the adhesion of ink-jet printing inks. Moreover, an object of the instant invention is to provide an ink-jet printing ink resin that provides improved color-fastness.

SUMMARY OF THE INVENTION

The above objects of the invention have been achieved in the development of a cationic, water-soluble polymer for ink-jet printing inks. Also, features of the instant invention include the ink-jet printing ink formulation comprising the invention resin, a method for preparing the invention resin, and a method of preparing an ink-jet printing ink formulation.

DESCRIPTION OF THE PREFERRED EMBODIMENT(S)

The invention cationic, water-soluble polymer comprises at least three types of monomer. The bulk of the monomer (preferably greater than 50 weight-%) is N-vinylpyrrolidinone, which confers water solubility to the polymer. The second monomer is N-methylolacrylamide, N-methylolmethacrylamide, or an alcohol-blocked version of one of these monomers, such as N-isobutoxymethylacrylamide, or mixtures thereof. This type of monomer comprises preferably from about 2 to about 20 weight-% of the polymer. Its function is to provide bonding of the polymer molecules to the pigment in the ink or the printing substrate or both.

The third type of monomer is one containing a quarternary ammonium group, such as methacryloyloxyethyltrimethylammonium chloride, methacryloyoloxyethyltriethylammonium ethosulfate, methacrylamidopropyltrimethylammonium chloride, and known equivalents thereof, or mixtures thereof. Generally, such monomers can be represented by the formula

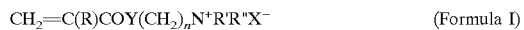

$$CH_2=C(R)COY(CH_2)_nN^+R'R''X^-  \qquad \text{(Formula I)}$$

where R is a hydrogen atom or a methyl group, Y is O or NH, n is an integer from 1 to about 4, R, R', and R" are alkyl or aralkyl groups independently containing from 1 to about 18 carbon atoms, and X is an anion such as chloride, bromide, tosylate, or alkylsulfate.

The cationic charge of this monomer provides the ink with affinity for substrates such as anionic paper surfaces. Preferably the polymer comprises from about 5 to about 45 weight-% of this monomer. Small amounts, preferably no more than about 20 weight-% of nonfunctional monomers, such as styrene, substituted styrenes, or alkyl (meth) acrylates may optionally be included.

As an alternative to using a preformed quarternary ammonium monomer, the quarternary cationic group can be formed in situ by the reaction of tertiary amine groups provided by the inclusion of tertiary amine-containing monomers with an alkylating agent. Typical tertiary amine-containing monomers used can be represented by the formula

$$CH_2=C(R)COY(CH_2)_nNRR'  \qquad \text{(Formula II)}$$

where R, Y, n, R, and R' have the same meaning as stated above in Formula I. Typical alkylating agents are alkyl halides, sulfates, or tosylates containing from 1 to about 18 carbon atoms.

The polymerization and, if applicable, the subsequent quaternization may be carried out in water, or a mixture of water and water-miscible organic solvents. It is desirable, however, that any solvents used preferably should have low boiling points, preferably lower than that of water, to facilitate their later removal by distillation. Any free radical initiator with a suitable half-life at the preferred reaction temperature of about 60° to about 95° C. can be used. Such initiators are well known in the art and include persulfates, organic peroxides, organic hydroperoxides, azo compounds, and various redox initiator systems. In another embodiment of the invention, chain transfer agents, such as mercaptans may be added to control molecular weight. The preferred weight average molecular weight for the polymers of the invention is from about 3000 to about 30,000. The solids content of the aqueous polymer solution product should be such as to give a viscosity suitable for practical handling in the ink making process. Preferably it will be in the range of from about 30 to about 60%.

The ink compositions employed in combination with the invention resin include a colorant, such as a dye or pigment, a carrier medium comprised of water, one or more organic solvents, or a mixture of water and one or more organic solvents. The carrier medium is present from about 40 to 80%, preferably from about 50 to 65% by weight, based on the total weight of the ink.

Suitable examples of organic solvents include: alcohols, such as methyl alcohol, ethyl alcohol, n-propyl alcohol, isopropyl alcohol, n-butyl alcohol, sec-butyl alcohol, or tert-butyl alcohol; amines, such as morpholine and ethanolamine; amides, such as dimethylformamide or dimethylacetamide; carboxylic acids; esters, such as ethyl acetate, ethyl lactate, and ethylene carbonate; ethers, such as tetrahydrofuran or dioxane; glycerine; glycols; glycol esters; glycol ethers; ketones, such as acetone, diacetone, or methyl ethyl ketone; lactams, such as N-isopropylcaprolactam or N-ethylvalerolactam; lactones, such as butyrolactone; organosulfides; sulfones, such as dimethylsulfone; organosulfoxides, such as butyrolactone; organosulfides; sulfones, such as dimethylsulfone; organosulfoxides, such as dimethyl sulfoxide or tetramethylene sulfoxide; and derivatives thereof and mixtures thereof. Among these organic components, an alcohol such as ethanol and a ketone such as methyl ethyl ketone are preferred.

The ink compositions typically contain at least one glycol that serves as a humectant to prevent drying of the compositions during the printing operation, as well as during storage of the compositions. Glycols suitably employed in the practice of the invention include ethylene glycol, diethylene glycol, triethylene glycol, tetraethylene glycol, propylene glycol, dipropylene glycol, glycerine, and polyethylene glycol. Diethylene glycol and propylene glycol are the preferred glycols.

The carrier media combinations used in the ink compositions must be compatible with the pigments so that flocculation or settling does not occur as a result of incompatibility. Also, the media combinations must be compatible with the materials of construction of the print head.

Pigments incorporated in the ink invention composition include pigments compatible with the other components of the composition.

No particular limitation is imposed on the type or the amount of pigment used. The term "pigment" refers to a water insoluble colorant. A large range of pigments, organic and inorganic, may be used either alone or in combination. Pigments used in ink jet inks typically are in the dispersed state. The pigment particals are kept from agglomerating and settling out of the carrier medium by placing acidic or basic functional groups on the surface of the pigments, attaching a polymer onto the surface of the pigments, or adding a surfactant to the ink.

The amount of the pigment present in the ink compositions is from about 0.1 to 30 wt %, preferably from about 2 to 10 wt %. Examples of a pigment that may be used in the practice of the present invention for a yellow ink include C.I. Pigment Yellow 1, C.I. Pigment Yellow 3, and C.I. Pigment Yellow 13. Examples of a pigment that may be used in the present invention for a magenta ink include C.I. Pigment Red 5, C.I. Pigment Red 7, C.I. Pigment Red 12, C.I. Pigment Red 112, and C.I. Pigment Red 122. Examples of a pigment that may be used in the present invention for a cyan ink include C.I. Pigment Blue 1, C.I. Pigment Blue 2, C.I. Pigment Blue 16, C.I. Vat Blue 4, and C.I. Vat Blue 6.

The pigment particles need to be small enough in size so that they move freely through the printing device. Because the ejecting nozzles of ink jet ink printers range in diameter from about 10 to 100 microns, pigments suitable for use in the present invention may have a range of particle sizes from about 0.01 microns to 100 microns, preferably from about 0.01 microns to 10 microns, and more preferably from about 0.01 microns to 5 microns.

Fine particles of metal or metal oxides also may be included as colorants for the compositions of the present invention. Metal and metal oxides are used in the preparation of magnetic ink jet inks. Examples may include silica, alumina, titania, and finely divided copper.

No particular limitation is imposed on the type or the amount of dye used. Dyes which are useful in the present invention are those which are water soluble or water-insoluble such as basic, acid, and direct dyes. If desired, the dyes can be reactive dyes which contain groups capable of forming covalent bonds with textile materials. The amount of dye present in the ink compositions is from about 0.1 to 30 wt %, preferably from about 2 to 10 wt %.

Basic dyes are preferred dyes for use in the present invention. Examples of suitable basic dyes include Basic Blue 1, Basic Blue 7, Basic Blue 26, Basic Green 1, Basic Orange 2, Basic Red 1, Basic Red 14, Basic Violet 1, Basic Violet 10, Basic Violet 11, and Basic Yellow 28.

No stringent limitation is imposed on the physical properties of the ink-jet ink formulation polymers. Preferred polymers are those having an acid number in the range of from about 10 to 300, a weight average molecular weight in the range of from about 500 to 100,000, a softening point in the range of from about 25 to $150_E$C, and a glass transition temperature of less than $150_E$C. More preferred polymers are those having an acid number in the range of from about 40 to 220, a weight average molecular weight in the range of from about 15,000 to 50,000, a softening point in the range of from about 25 to $90_E$C, and a glass transition temperature of less than $90_E$C.

Any suitable amount of the polymer can be used. The polymer is used preferably in an amount in the range of from about 1% to 40%, more preferably in the range of from about 5% to 15%.

When the majority carrier medium is water, the ink of the present invention is preferably adjusted to an alkaline pH so that the solubility of the polymer and the long-term stability of the ink can be improved. According to the present invention, the pH value of the ink is preferably within the range of 7 to 10. Examples of pH adjustors include organic amines such as monoethanolamine, diethanolamine, triethanolamine, aminomethyl propanol, and ammonia, and inorganic alkali agents such as sodium hydroxide, lithium hydroxide, and potassium hydroxide.

When the majority carrier medium is an organic solvent, it may be necessary to add an agent to increase the conductivity of the ink. Examples of additives include potassium thiocyanate, lithium nitrate, and trimethyl ammonium chloride.

A particularly desirable feature of the invention ink jet ink formulation is that there is no limitation placed on the recording medium, or substrate, used in conjunction with the above printing methods. Any suitable substrate can be employed, including porous substrates such as the cellulosic substrates of paper and textiles (e.g., cotton and rayon), as well as nonporous substrates such as glass, aluminum, polyethylene, polypropylene, and polyvinyl chloride. In one embodiment of the invention where the substrate is a cellulosic substrate, the invention resin coating may be applied either before or after ink-jet printing onto the substrate.

As appreciated in the art, the exact components and properties of the components desired for any given ink application can vary, and, therefore, routine experimentation may be required to determine the optional components and proportions of components for a given application and desired properties.

The present invention will now be described in more detail through the use of the following examples. The examples are presented for illustrative purposes only, and are not intended to restrict the scope of the invention.

Example 1

The invention coating resin may be prepared by charging a 500 ml flask fitted with a reflux condenser, stirrer, and temperature control device with 60 g. of isopropyl alcohol and 50 g. of deionized water. The flask was heated to reflux (about 82° C.), and a mixture of 70 g. of N-vinylpyrrolidinone, 10 g. of N-methylolacrylamide, 20 g. of dimethylaminoethyl methacrylate, and 2 g. of lauryl mercaptan was added concurrently with a mixture of 2 g. of Trigonox 21 and 20 g. of isopropyl alcohol over two hours. Reflux was continued for two more hours, and then a mixture of 2 g. of Trigonox 21 (a peroxide initiator manufactured by AKZO) and 20 g. of isopropyl alcohol was added. Reflux was continued for one hour, and then 22 g. of benzyl bromide was added. Reflux was continued for two hours, and the batch was cooled and allowed to stand overnight. The next day, 50 g. of deionized water was added, the apparatus was reconfigured for distillation, and the batch was heated slowly to 90° C. to remove the isopropyl alcohol. The result was a 50% solids solution of a cationic acrylic resin.

Example 2

Another example of invention resin preparation is to charge a 500 ml flask fitted with a reflux condenser, stirrer, and temperature control device with 60 g of isopropyl alcohol and 50 g of deionized water. The flask was heated to reflux, and a mixture of 70 g of N-vinylpyrrolidinone, 10 g of N-methylolacrylamide, 35 g of Mhoromer BM-606 (a 75% aqueous solution of methacryloyloxyethyltrimethylammonium chloride manufactured by Hüls), and 1 g of 2-mercaptoethanol was added concurrently with a mixture of 2 g of Trigonox 21 and 20 g of isopropyl alcohol over two hours. Reflux was continued for two more hours, and then a mixture of 2 g of Trigonox 21 and 20 g of isopropyl alcohol was added. Reflux was continued for two more hours, and then the flask was reconfigured for distillation, 40 g of deionized water was added, and the batch was slowly heated to $98_EC$ to remove the isopropyl alcohol. The product was a clear, amber solution of cationic acrylic resin.

Example 3

An ink jet ink was prepared with the following composition: 5 parts Rhodamine B dye (Basic Violet 10, C.I. 45170, Aldrich Chemical Co.), 10 parts of the polymer described in Example 1, 15 parts ethylene glycol, and 70 parts deionized water. The ingredients were thoroughly mixed to give a homogeneous mixture and the pH of the ink was adjusted to 8. The ink was filtered under pressure using a membrane filter having a pore size of 0.45 μm. The ink was loaded into a Hewlett Packard HP 855 Cse printer and a large solid area 2"×5" and text were printed on Xerox 4024DP paper (Xerox Corp.). The optical density of the large solid area of the print was measured with a X-Rite® 418 Color Reflection Densitometer from X-Rite, Inc. The print had an optical density of 1.40 and the quality of the text was excellent.

Example 4

An ink jet ink was prepared with the following composition: 5 parts Rhodamine B dye (Basic Violet 10, C.I. 45170, Aldrich Chemical Co.), 10 parts of the polymer described in Example 2, 15 parts ethylene glycol, and 70 parts deionized water. The ingredients were thoroughly mixed to give a homogeneous mixture and the pH of the ink was adjusted to 8. The ink was filtered under pressure using a membrane filter having a pore size of 0.45 $_F$m. The ink was loaded into a Hewlett Packard HP 855 Cse printer and a large solid area 2"×5" and text were printed on Xerox 4024DP paper (Xerox Corp.). The optical density of the large solid area of the print was measured with a X-Rite® 418 Color Reflection Densitometer from X-Rite, Inc. The print had an optical density of 1.44 and the quality of the text was excellent.

Example 5

An ink jet ink was prepared with the following composition: 5 parts Victoria Blue B dye (Basic Blue 26, C.I. 44045 supplied by Aldrich Chemical Co.). 10 parts of the polymer described in Example 2, 10 parts Liponic7 EG-1 (Lipo Chemicals, Inc.), 5 parts 2-pyrrolidinone, and 70 parts deionized water. The ingredients were thoroughly mixed to give a homogeneous mixture and the pH of the ink was adjusted to 8. The ink was filtered under pressure using a membrane filter having a pore size of 0.45 μm. The ink was loaded into a Hewlett Packard HP 855 Cse printer and a large solid area 2"×5" and text were printed on Xerox 4024DP paper (Xerox Corp.). The optical density of the large solid area of the print was measured with a X-Rite® 418 Color Reflection Densitometer from X-Rite, Inc. The print had an optical density of 1.06 and the quality of the text was excellent.

The subject matter of the claimed invention is:

(1) An ink-jet ink resin composition comprising a first monomer, a second monomer, and a third monomer wherein the first monomer is N-vinylpyrrolidinone, the second monomer is selected from the group consisting of N-methylolacrylamide, N-methylolmethacrylamide, N-isobutoxymethylacrylamide, and mixtures thereof, and the third monomer is a monomer characterized by including therein a quaternary ammonium group;

(2) The composition of (1) wherein the third monomer is represented by the formula:

$CH_2=CH(R)COY(CH_2)_nN^+R'R''X^-$ wherein R is a hydrogen atom or a methyl group; Y is O or NH; n is an integer from 1 to about 4; R, R', and R'' are alkyl or aralkyl groups independently containing from 1 to about 18 carbon atoms; and X is an anion such as chloride, bromide, tosylate, or alkylsulfate;

(3) The composition of (2) wherein the third monomer is selected from the group consisting of methacrylyloxyethyltrimethylammonium chloride, methacrylyloxyethyltriethylammonium ethosulfate, methacrylamidopropyltrimethylammonium chloride, and mixtures thereof;

(4) The composition of (2) wherein the third monomer is formed by reacting tertiary amine-containing monomers with an alkylating agent;

(5) The composition of (4) wherein the tertiary amine-containing monomers are represented by the formula:

$CH_2=C(R)COY(CH_2)_nNRR'$ wherein Y is O or NH; n is an integer from 1 to 4; R and R' are alkyl or aralkyl groups independently containing from 1 to 18 carbon atoms;

(6) The composition of (4) wherein the alkylating agents are selected from the group consisting of alkyl halides, sulfates, and tosylates containing from 1 to 18 carbon atoms;

(7) The composition of (2) wherein the polymer is characterized by an weight average molecular weight of from about 3000 to 30,000;

(8) The composition of (2) wherein the polymer is an aqueous polymer solution characterized by a solids content from about 30% to about 60%;

(9) The composition of (1) wherein the colorant is a pigment selected from the group consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, and C.I. Vat Blue 6;

(10) The composition of (1) wherein the colorant is a pigment selected from the group consisting of silica, alumina, titania, and finely divided copper;

(11) The composition of (1) wherein the colorant is present in an amount from about 0.1 to 30 wt %;

(12) The composition of (11) wherein the colorant is present in an amount from about 2 to 10 wt %;

(13) The composition of (1) wherein the carrier medium is selected from the group consisting of water, an organic solvent, and a mixture of water and an organic solvent;

(14) The composition of (13) wherein the organic solvent is selected from the group consisting of alcohol, amine, amides, carboxylic acid, ester, ether, glycerine, glycol, glycol ester, glycol ether, ketone, lactam, lactone, organosulfide, sulfone, organosulfoxide, derivitives thereof, and mixtures thereof;

(15) The composition of (14) wherein the alcohol is selected from the group consisting of methyl alcohol, ethyl alcohol, n-propyl alcohol, isopropyl alcohol, n-butyl alcohol, sec-butyl alcohol, and tert-butyl alcohol;

(16) The composition of (14) wherein the amine is selected from the group consisting of morpholine and ethanolamine;

(17) The composition of (14) wherein the amide is selected from the group consisting of dimethylformamide and dimethylacetamide;

(18) The composition of (14) wherein the ester is selected from the group consisting of ethyl acetate, ethyl lactate, and ethylene carbonate;

(19) The composition of (14) wherein the ether is selected from the group consisting of tetrahydrofuran and dioxane;

(20) The composition of (14) wherein the ketone is selected from the group consisting of acetone, diacetone, and methyl ethyl ketone;

(21) The composition of (14) wherein the lactam is selected from the group consisting of N-isopropyl caprolactam and N-ethyl valerolactam;

(22) The composition of (14) wherein the lactone is butyrolactone;

(23) The composition of (14) wherein the sulfone is dimethylsulfone;

(24) The composition of (14) wherein the organosulfoxide is selected from the group consisting of dimethyl sulfoxide and tetramethylene sulfoxide;

(25) The composition of (2) wherein the polymer is present in an amount from about 1% to about 40%, based on the weight of the composition;

(26) The composition of (24) wherein the polymer is present in an amount from about 5% to about 15%, based on the weight of the compositon;

(27) The composition of (1) wherein the colorant is a dye;

(28) The composition of (27) wherein the dye a basic dye;

(29) The composition of (28) wherein the basic dye is selected from the group basic dyes consisting of Basic Blue 1, Basic Blue 7, Basic Blue 26, Basic Green 1, Basic Orange 2, Basic Red 1, Basic Red 14, Basic Violet 1, Basic Violet 10, Basic Violet 11, and Basic Yellow 28;

(30) The composition of (13) wherein the carrier medium is present in an amount from about 40% to about 80%, based on the total weight of the composition; and

(31) The composition of (3) wherein the carrier medium is present in an amount from about 30% to about 60%, based on the total weight of the composition.

Modifications to this invention will occur to those skilled in the art. Therefore, it is to be understood that this invention is not necessarily limited to the particular embodiments disclosed; rather, it is intended to cover all modifications which are within the true spirit and scope of this invention, as disclosed and claimed herein.

What is claimed is:

1. An ink-jet printing ink composition comprising a colorant, a carrier medium, and a cationic, water-soluble resin composition comprising a first monomer, a second monomer, and a third monomer wherein the first monomer is N-vinylpyrrolidinone, the second monomer is selected from the group consisting of N-methylolacrylamide, N-methylolmethacrylamide, N-isobutoxymethylacrylamide, and mixtures thereof, and the third monomer is represented by the formula:

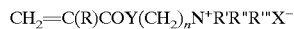

wherein R is a hydrogen atom or a methyl group; Y is O or NH; n is an integer from 1 to about 4; R', R", and R''' are hydrogen or alkyl or aralkyl groups independently containing from 1 to about 18 carbon atoms; and X is an anion such as chloride, bromide, tosylate, or alkylsulfate.

2. The composition of claim 1 wherein the third monomer is selected from the group consisting of methacrylyloxyethyltrimethylammonium chloride, methacrylyloxyethyltriethylammonium ethosulfate, methacrylamidopropyltrimethylammonium chloride, and mixtures thereof.

3. The composition of claim 1 wherein the third monomer is formed by reacting tertiary amine-containing monomers with an alkylating agent.

4. The composition of claim 3 wherein the tertiary amine-containing monomers are represented by the formula:

wherein Y is O or NH; n is an integer from 1 to 4; R, and R' are alkyl or aralkyl groups independently containing from 1 to 18 carbon atoms.

5. The composition of claim 3 wherein the alkylating agents are selected from the group consisting of alkyl halides, sulfates, and tosylates containing from 1 to 18 carbon atoms.

6. The composition of claim 1 wherein the polymer is characterized by an weight average molecular weight of from about 3000 to 30,000.

7. The composition of claim 1 wherein the polymer is an aqueous polymer solution characterized by a solids content from about 30% to about 60%.

8. The composition of claim 1 wherein the colorant is a pigment selected from the group consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, and C.I. Vat Blue 6.

9. The composition of claim 1 wherein the colorant is a pigment selected from the group consisting of silica, alumina, titania, and finely divided copper.

10. The composition of claim 1 wherein the colorant is present in an amount from about 0.1 to 30 wt %.

11. The composition of claim 10 wherein the colorant is present in an amount from about 2 to 10 wt %.

12. The composition of claim 1 wherein the carrier medium is selected from the group consisting of water, an organic solvent, and a mixture of water and an organic solvent.

13. The composition of claim 12 wherein the organic solvent is selected from the group consisting of alcohol, amine, amides, carboxylic acid, ester, ether, glycerine, glycol, glycol ester, glycol ether, ketone, lactam, lactone, organosulfide, sulfone, organosulfoxide, derivitives thereof, and mixtures thereof.

14. The composition of claim 13 wherein the alcohol is selected from the group consisting of methyl alcohol, ethyl alcohol, n-propyl alcohol, isopropyl alcohol, n-butyl alcohol, sec-butyl alcohol, and tert-butyl alcohol.

15. The composition of claim 13 wherein the amine is selected from the group consisting of morpholine and ethanolamine.

16. The composition of claim 13 wherein the amide is selected from the group consisting of dimethylformamide and dimethylacetamide.

17. The composition of claim 13 wherein the ester is selected from the group consisting of ethyl acetate, ethyl lactate, and ethylene carbonate.

18. The composition of claim 13 wherein the ether is selected from the group consisting of tetrahydrofuran and dioxane.

19. The composition of claim 13 wherein the ketone is selected from the group consisting of acetone, diacetone, and methyl ethyl ketone.

20. The composition of claim 13 wherein the lactam is selected from the group consisting of N-isopropyl caprolactam and N-ethyl valerolactam.

21. The composition of claim 13 wherein the lactone is butyrolactone.

22. The composition of claim 13 wherein the sulfone is dimethylsulfone.

23. The composition of claim 13 wherein the organosulfoxide is selected from the group consisting of dimethyl sulfoxide and tetramethylene sulfoxide.

24. The composition of claim 23 wherein the polymer is present in an amount from about 5% to about 15%, based on the weight of the compositon.

25. The composition of claim 12 wherein the carrier medium is present in an amount from about 40% to about 80%, based on the total weight of the composition.

26. The composition of claim 25 wherein the carrier medium is present in an amount from about 30% to about 60%, based on the total weight of the composition.

27. The composition of claim 1 wherein the polymer is present in an amount from about 1% to about 40%, based on the weight of the composition.

28. The composition of claim 1 wherein the colorant is a dye.

29. The composition of claim 28 wherein the dye a basic dye.

30. The composition of claim 29 wherein the basic dye is selected from the group basic dyes consisting of Basic Blue 1, Basic Blue 7, Basic Blue 26, Basic Green 1, Basic Orange 2, Basic Red 1, Basic Red 14, Basic Violet 1, Basic Violet 10, Basic Violet 11, and Basic Yellow 28.

* * * * *